United States Patent
Viswanathan

(10) Patent No.: US 8,920,688 B2
(45) Date of Patent: Dec. 30, 2014

(54) MICROWAVE-ASSISTED SYNTHESIS OF TRANSITION METAL PHOSPHIDE

(75) Inventor: Tito Viswanathan, Little Rock, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 533 days.

(21) Appl. No.: 12/754,336

(22) Filed: Apr. 5, 2010

(65) Prior Publication Data

US 2010/0310442 A1    Dec. 9, 2010

Related U.S. Application Data

(63) Continuation-in-part of application No. 12/487,323, filed on Jun. 18, 2009, now abandoned.

(60) Provisional application No. 61/211,807, filed on Apr. 3, 2009, provisional application No. 61/132,380, filed on Jun. 18, 2008.

(51) Int. Cl.
*C01B 25/08*     (2006.01)
*C01B 25/00*     (2006.01)

(52) U.S. Cl.
CPC ............. *C01B 25/08* (2013.01); *C01P 2002/72* (2013.01); *C01P 2002/85* (2013.01); *C01P 2004/03* (2013.01); *Y10S 977/773* (2013.01); *Y10S 977/81* (2013.01); *Y10S 977/813* (2013.01); *Y10S 977/901* (2013.01)
USPC ................. 252/521.6; 252/519.14; 252/518.1; 423/299; 977/773; 977/810; 977/813; 977/901

(58) Field of Classification Search
USPC ....................... 252/500–518.1, 519.14, 521.6; 423/447–449, 299; 977/773, 810, 813, 977/901

See application file for complete search history.

(56) References Cited

U.S. PATENT DOCUMENTS

| 3,803,033 A | 4/1974 | Sutherland |
| 3,886,093 A | 5/1975 | Dimitri |
| 4,019,995 A | 4/1977 | Briggs |
| 4,108,767 A | 8/1978 | Cooper |
| 4,176,172 A | 11/1979 | Bennetch et al. |
| 4,414,196 A | 11/1983 | Matsumoto et al. |
| 4,457,853 A | 7/1984 | Detroit |
| 4,985,225 A * | 1/1991 | Hashimoto et al. ........... 423/412 |
| 5,317,045 A | 5/1994 | Clark et al. |

(Continued)

FOREIGN PATENT DOCUMENTS

| CN | 1876566 A | 12/2006 |
| WO | WO0123501 A1 * | 5/2001 ............. C10G 45/04 |

OTHER PUBLICATIONS

Antal et al., Flash carbonization of biomass, Industrial & Engineering Chemistry Research, 2003, 42(16), 3690-3699.

(Continued)

*Primary Examiner* — Tri V Nguyen
(74) *Attorney, Agent, or Firm* — Morris, Manning & Martin, LLP; Tim Tingkang Xia, Esq.

(57) ABSTRACT

A method of synthesizing transition metal phosphide. In one embodiment, the method has the steps of preparing a transition metal lignosulfonate, mixing the transition metal lignosulfonate with phosphoric acid to form a mixture, and subjecting the mixture to a microwave radiation for a duration of time effective to obtain a transition metal phosphide.

10 Claims, 5 Drawing Sheets

(56) References Cited

U.S. PATENT DOCUMENTS

| | | | |
|---|---|---|---|
| 5,531,922 | A | 7/1996 | Okinaka et al. |
| 5,604,037 | A | 2/1997 | Ting |
| 5,972,537 | A | 10/1999 | Mao |
| 6,030,688 | A | 2/2000 | Hayashi et al. |
| 6,099,990 | A | 8/2000 | Denton |
| 6,232,264 | B1 | 5/2001 | Lukehart et al. |
| 6,486,008 | B1 | 11/2002 | Lee |
| 6,616,747 | B2 | 9/2003 | Sumita |
| 6,733,827 | B2 | 5/2004 | Mitchell et al. |
| 6,764,617 | B1 | 7/2004 | Viswanathan |
| 7,208,134 | B2 | 4/2007 | Bromberg et al. |
| 7,220,484 | B2 | 5/2007 | Ton-That |
| 7,297,652 | B2 | 11/2007 | Jhung et al. |
| 7,303,679 | B2 | 12/2007 | Ulicny |
| 7,358,325 | B2 | 4/2008 | Hayes |
| 7,758,756 | B2 | 7/2010 | Kim |
| 7,811,545 | B2 | 10/2010 | Hyeon et al. |
| 2002/0064495 | A1 | 5/2002 | Miura et al. |
| 2003/0044712 | A1 | 3/2003 | Matsui et al. |
| 2003/0187102 | A1 | 10/2003 | Medoff et al. |
| 2004/0147397 | A1 | 7/2004 | Miller et al. |
| 2005/0139550 | A1 | 6/2005 | Ulicny |
| 2005/0181941 | A1 | 8/2005 | Sugo et al. |
| 2005/0186344 | A1 | 8/2005 | Takagi |
| 2005/0271816 | A1 | 12/2005 | Meschke |
| 2007/0129233 | A1 | 6/2007 | Ueno et al. |
| 2007/0141502 | A1 | 6/2007 | Aga et al. |
| 2007/0142225 | A1 | 6/2007 | Baker |
| 2007/0218564 | A1 | 9/2007 | Bachmann et al. |
| 2007/0243337 | A1 | 10/2007 | Xiong |
| 2007/0264574 | A1 | 11/2007 | Kim |
| 2007/0266825 | A1 | 11/2007 | Ripley |
| 2008/0017291 | A1* | 1/2008 | Shin et al. ............... 156/1 |
| 2008/0026219 | A1 | 1/2008 | Tsushima et al. |
| 2008/0160306 | A1* | 7/2008 | Mushtaq et al. ........... 428/402 |
| 2010/0200501 | A1 | 8/2010 | Hoag |
| 2010/0283005 | A1* | 11/2010 | Pickett et al. ......... 252/301.6 S |
| 2011/0253546 | A1 | 10/2011 | Li et al. |
| 2011/0256401 | A1 | 10/2011 | Goodell et al. |

OTHER PUBLICATIONS

Bao et al., A novel nanostructure of nickel nanotubes encapsulated in carbon nanotubes, Chemical Communications, Cambridge, United Kingdom, 2003, (2), 208-209.

Bender et al., Total Phosphorous in Residual Materials, In Methods of Phosphorus Analysis for Soils, Sediments, Residuals, and Waters, Pierzynski, G.M., Ed. Southern Cooperative Series Bulletin No. 396. 2000.

Chen et al., Microwave-assisted synthesis of carbon supported Pt Nanoparticles for fuel cell applications, Chemical Communications, Cambridge, United Kingdom, 2002, (21), 2588-2589.

Compere et al., Low cost carbon fiber from renewable resources, Oak Ridge National Laboratory, Oak Ridge TN, USA, International Sampe Technical Conference, 2001, 33, 1306-1314, Society for the Advancement of Material and Process Engineering.

Hu et al., Microwave-assisted synthesis of a superparamagnetic surface-functionalized porous Fe3O4/C nanocomposite, Chemistry—An Asia Journal, 2006, 1(4), 605-610.

Kang et al., Obtaining carbon nanotubes from grass, Nanotechnology, 2005, 16(8), 1192-1195.

Kubo et al., Carbon fibers from Lignin-recyclable plastic blends, Encyclopedia of Chemical Processing, vol. 1, 2003, ' Sunggyu Lee, CRC Press pp. 317-332.

Lagashetty et al., Microwave-assisted route for synthesis of nanosized metal oxides, Science and Technology of Advanced Materials, 2007, 8(6), 484-493.

Liu, Shuling; Liu, Xinzheng; Xu, Liqiang; Qian, Yitai; Ma, Xicheng. Controlled synthesis and characterization of nickel phosphide nanocrystal. Journal of Crystal Growth (2007), 304(2), 430-434.

Marina Sofos et al., A synergistic assembly of nanoscale lamellar photoconductor hybrids, Nature Materials, 2009, 68-75, vol. 8, Nature Publishing Group.

Mayo JT, Yavuz C, Yean S, Cong L, Shipley H, Yu W, Falkner J, Kan A, Tomson M, Colvin VL, The effect of nanocrystalline magnetite size on arsenic removal, Science and Technology of Advanced Materials (2007), 8(1-2), 71-75.

Meng Qinghan et al., Copper-doped mesoporous activated carbons as electrode material for electrochemical capacitors, Journal of Applied Electrochemistry, 2006, 36(1), 63-67.

Osswald et al., Control of sp2/sp3 Carbon Ratio and Surface Chemistry of Nanodiamond Powders by Selective Oxidation in Air, J. Am. Chem. Soc., 2006, 128(35), pp. 11635-11642.

Oyama, Novel catalysts for advanced hydroprocessing: transition metal phosphides, Journal of Catalysis, 2003, 216 (1-2), 343-352.

Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. Journal of Catalysis (2002), 209(1), 1-5.

Oyama, S. Ted; Lee, Yong-Kul. Mechanism of Hydrodenitrogenation on Phosphides and Sulfides. Journal of Physical Chemistry B (2005), 109(6), 2109-2119.

Rao et al., Synthesis of Inorganic Solids Using Microwaves, Chemistry of Materials, 1999, 11(4), 882-895.

Shipley HJ, Yean S, Kan AT, Tomson MB, Adsorption of arsenic to magnetite nanoparticles: effect of particle concentration, pH, ionic strength, and temperature, Environmental Toxicology and Chemistry (2009), 28(3), 509-515.

Vaclavikova M, Gallios GP, Hredzak S, Jakabsky S, Removal of arsenic from water streams: an overview of available techniques, Clean Technologies and Environmental Policy (2008), 10(1), 89-95.

Vivas, N.; Bourgeois, G.; Vitry, C.; Glories, Y.; de Freitas, V., "Determination of the composition of commercial tannin extracts by liquid secondary ion mass spectrometry" J. Sci. Food Agric., 1996, 72, 309-317.

Walkiewicz et al., Microwave heating characteristics of selected minerals and compounds, Minerals & Metallurgical Processing, 1988, 5(1), 39-42.

Wang, Xinjun; Han, Kun; Gao, Youjun; Wan, Fuquan; Jiang, Kai. Fabrication of novel copper phosphide (Cu3P) hollow spheres by a simple solvothermal method. Journal of Crystal Growth (2007), 307(1), 126-130.

Wei Liu et al., A Novel Carbothermal Method for the Preparation of Nano-sized WC on High Surface Area Carbon, Chemistry Letters, 2006, 1148-1149, vol. 35, No. 10, The Chemical Society of Japan, Tsukuba, Japan.

Xie, Songhai; Qiao, Minghua; Zhou, Wuzong; Luo, Ge; He, Heyong; Fan, Kangnian; Zhao, Tiejun; Yuan, Weikang. Controlled synthesis, characterization, and crystallization of Ni—P nanospheres. Journal of Physical Chemistry B (2005), 109(51), 24361-24368.

Xu et al., Preparation and characterization of NiO nanorods by thermal decomposition of NiC2O4 precursor, Journal of Materials Science, 2003, 38(4), 779-782.

Yu et al., Microwaved-assisted synthesis and in-situ self-assembly of coaxial Ag/C nanotubes, Chemical Communications, Cambridge, United Kingdom, 2005, 21, 2704-2706.

Zhang et al., Microwave synthesis of nanocarbons from conducting polymers, Chemical Communications, Cambridge, United Kingdom, 2006, (23), 2477-2479.

Zhu et al., Enhanced field emission from O2 and CF4 plasma-treated CuO nanowires, Chemical Physics Letters, 2006, 419(4-6), 458-463.

* cited by examiner

| Element | Wt % | At % |
|---|---|---|
| C K | 75.27 | 89.05 |
| O K | 06.94 | 06.16 |
| Al K | 00.27 | 00.14 |
| P K | 02.54 | 01.17 |
| S K | 00.51 | 00.23 |
| K K | 00.14 | 00.05 |
| Cu K | 14.33 | 03.20 |

MICROWAVE-ASSISTED SYNTHESIS OF TRANSITION METAL PHOSPHIDE

CROSS-REFERENCE TO RELATED PATENT APPLICATION

This application claims the benefit, pursuant to 35 U.S.C. §119(e), of U.S. provisional patent application Ser. No. 61/211,807, filed Apr. 3, 2009, entitled "Novel Microwave Assisted Synthesis of Transition Metal Phosphide Nanoparticles," by Tito Viswanathan, which is incorporated herein by reference in its entirety.

This application also is a continuation-in-part of U.S. patent application Ser. No. 12/487,323, filed on Jun. 18, 2009, now abandoned entitled "MICROWAVE-ASSISTED SYNTHESIS OF CARBON AND CARBON-METAL COMPOSITES FROM LIGNIN, TANNIN AND ASPHALT DERIVATIVES AND APPLICATIONS OF SAME" by Tito Viswanathan, which is incorporated herein by reference in its entirety and itself claims the benefit, pursuant to 35 U.S.C. §119(e), of U.S. provisional patent application Ser. No. 61/132,380, filed Jun. 18, 2008, entitled "MICROWAVE-ASSISTED SYNTHESIS OF CARBON AND CARBON-METAL COMPOSITES FROM LINGIN, TANNIN AND ASPHALT DERIVATIVES," by Tito Viswanathan, which is incorporated herein by reference in its entirety. U.S. patent application Ser. No. 12/487,323 itself is related to U.S. patent application Ser. No. 12/487,174, filed Jun. 18, 2009, entitled, "MICROWAVE-ASSISTED SYNTHESIS OF CARBON AND CARBON-METAL COMPOSITES FROM LINGIN, TANNIN AND ASPHALT DERIVATIVES", now issued as U.S. Pat. No. 8,167,973, on May 1, 2012, the content of which is incorporated herein in its entirety by reference.

STATEMENT OF FEDERALLY-SPONSORED RESEARCH

The present invention was made with Government support under Grant Nos. 08-EPSCOR-009-REU and DEFC 36-06G086072, awarded by National Science Foundation (NSF-EPSCOR SURF) and U.S. Department of Energy (DOE), respectively. The government has certain rights in the invention.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references, if any, listed, cited and/or discussed in this specification are incorporated herein by reference in their entireties and to the same extent as if each reference was individually incorporated by reference. In terms of notation, hereinafter, superscript "[ ]$^n$" represents the nth reference cited in the reference list. For example, [ ]$^1$ represents the first reference cited in the reference list, namely, Oyama, S. Ted, Novel catalysts for advanced hydroprocessing: transition metal phosphides. *Journal of Catalysis* (2003), 216(1-2), 343-352.

FIELD OF THE INVENTION

The present invention relates generally to a method or process of synthesizing transition metal phosphides, and more particularly to a microwave-assisted method or process of synthesizing transition metal phosphides, and applications of same.

BACKGROUND

Transition metal phosphides belong to an important and exciting class of materials with a wide range of emerging applications. One of the applications that have attracted a lot of attention recently is in the petroleum industry. The hydroprocessing of crude oil containing S and N is of paramount importance to the gas and oil industry. This will play an ever increasing importance in the future due to declining quality of oil produced as well as stricter laws mandating reduced level in gasoline and diesel. In view of keeping up with the imposed restrictions it is imperative that improved catalysts for accomplishing these goals be investigated. S—Mo—Ni/$Al_2O_3$ has been used in hydrodenitrogenation and hydrodesulfurization of petroleum feedstocks. Researchers have shown that transition metal phosphides are very active catalysts in hydroprocessing.[1,2]

Among these catalysts, Nickel phosphide, $Ni_2P$, on silica support has been shown to exhibit excellent performance characteristics in both hydrodenitrogenation (HDN) as well as hydrodesulfurization (HDS) with activities greater than commercially available mixed transition metal Ni—Mo—S/$Al_2O_3$ catalyst.[2]

The discovery of $Ni_2P$ as an outstanding catalyst for both HDN and HDS has attracted interest in the synthesis of nickel phosphides.[3] A comparison of the different synthetic procedures for transition metal phosphide synthesis, indicates that most are tedious that use highly reactive and expensive precursors, use electrolytic reduction or $H_2$ gas for the transformation. Prior techniques have included the combination of the elements under extreme temperature and pressure, reaction of metal chloride with phosphine gas, decomposition of complex organometallics, electrolysis and reduction of phosphate with gaseous hydrogen.[1]

A different method for controlled synthesis of $Ni_2P$ nanocrystals has been reported recently by Liu et al.[4] The procedure involves reacting yellow phosphorous and $Ni_2SO_4$ in ethylene glycol: water solvent in an autoclave at 180° C. for 12 hours. The black solid product is filtered and washed with absolute ethanol, benzene and water. The XRD of the product showed that it was $Ni_2P$ and the morphology was dentritic as determined by SEM. The mechanism of the formation of the product was thought to involve the formation of $PH_3$ upon the reaction of P with water and with $H_3PO_4$. Once generated nickel ions were theorized to combine with $PH_3$ to form $Ni_2P$.

Xie et. al[5] have reported the synthesis of irregular Nickel phosphide nanocrystals containing Ni, $Ni_3P$, $Ni_5P_2$ and $Ni_{12}P_5$ by a milder route using $NiCl_2$ and sodium hypophosphite as reactants at 190° C. The product after reflux was washed with ammonia and ethanol. Copper phosphide hollow spheres have been synthesized in ethylene glycol by a solvothermal process using copper hydroxide and elemental phosphorus as starting material using an autoclave at 200° C. for 15 hours.[6]

Nevertheless, it is believed that the existing techniques are neither economically attractive nor quick or safe, for large scale commercial manufacture in an industrial setting.

Therefore, a heretofore unaddressed need exists in the art to address the aforementioned deficiencies and inadequacies.

SUMMARY OF THE INVENTION

In one aspect, the present invention provides a method of synthesizing transition metal phosphide. In one embodiment, the method has the steps of:

preparing a transition metal lignosulfonate;

mixing the transition metal lignosulfonate with phosphoric acid to form a mixture; and subjecting the mixture to a microwave radiation for a duration of time effective to obtain a transition metal phosphide.

In one embodiment, the preparing step comprises the step of heating a mixture of calcium lignosulfonate and a transition metal sulfate to a first temperature to obtain the transition metal lignosulfonate. The first temperature is about 90° C.

The transition metal comprises one of Ni, Cu, Mn, Fe, In, Ga, and Mo.

In one embodiment, the frequency of the microwave radiation is about 2.45 GHz.

In one embodiment, the transition metal phosphide is formed in the form of nanospheres. The average size of the nano-spheres is less than 100 nm.

In one embodiment, the transition metal phosphide is formed in in the form of nano-spheres and nano-sticks, respectively.

In another aspect, the present invention provides an article of manufacture made by the method set forth immediately above.

In yet another aspect, the present invention provides a method of synthesizing transition metal phosphide. In one embodiment, the method has the steps of:

preparing a mixture comprising a salt of lignin, a transition metal salt, phosphoric acid, silica, and carbon black; and subjecting the mixture to a microwave radiation for a duration of time effective to obtain a transition metal phosphide.

In a further aspect, the present invention provides an article of manufacture made by the method set forth immediately above.

In yet a further aspect, the present invention provides a method of synthesizing transition metal phosphide. In one embodiment, the method has the steps of:

preparing a mixture comprising a salt of lignin, a transition metal salt, and phosphoric acid; and subjecting the mixture to a microwave radiation for a duration of time effective to obtain a transition metal phosphide.

In a further aspect, the present invention provides an article of manufacture made by the method set forth immediately above.

In yet another aspect, the present invention provides a method of synthesizing transition metal phosphide. In one embodiment, the method has the steps of:

preparing a mixture comprising a salt of lignin, a transition metal salt, and a compound containing a pnictogen selected from the group consisting of nitrogen, phosphorus, arsenic, antimony, and bismuth; and subjecting the mixture to a microwave radiation for a duration of time effective to obtain a transition metal pnictide.

In another aspect, the present invention provides a method of synthesizing transition metal chalcogenide. In one embodiment, the method has the steps of:

preparing a mixture comprising a salt of lignin, a transition metal salt, and a compound containing a chalcogen selected from the group consisting of oxygen, sulfur, selenium, and tellurium; and subjecting the mixture to a microwave radiation for a duration of time effective to obtain a transition metal chalcogenide.

In yet another aspect, the present invention provides a method of synthesizing transition metal tetrilide. In one embodiment, the method has the steps of:

preparing a mixture comprising a salt of lignin, a transition metal salt, and a compound containing an element selected from the group consisting of carbon, silicon, germanium, tin, and lead; and subjecting the mixture to a microwave radiation for a duration of time effective to obtain a transition metal tetrilide.

These and other aspects of the present invention will become apparent from the following description of the preferred embodiment taken in conjunction with the following drawings and their captions, although variations and modifications therein may be affected without departing from the spirit and scope of the novel concepts of the disclosure.

DETAILED DESCRIPTION

Figure 1:
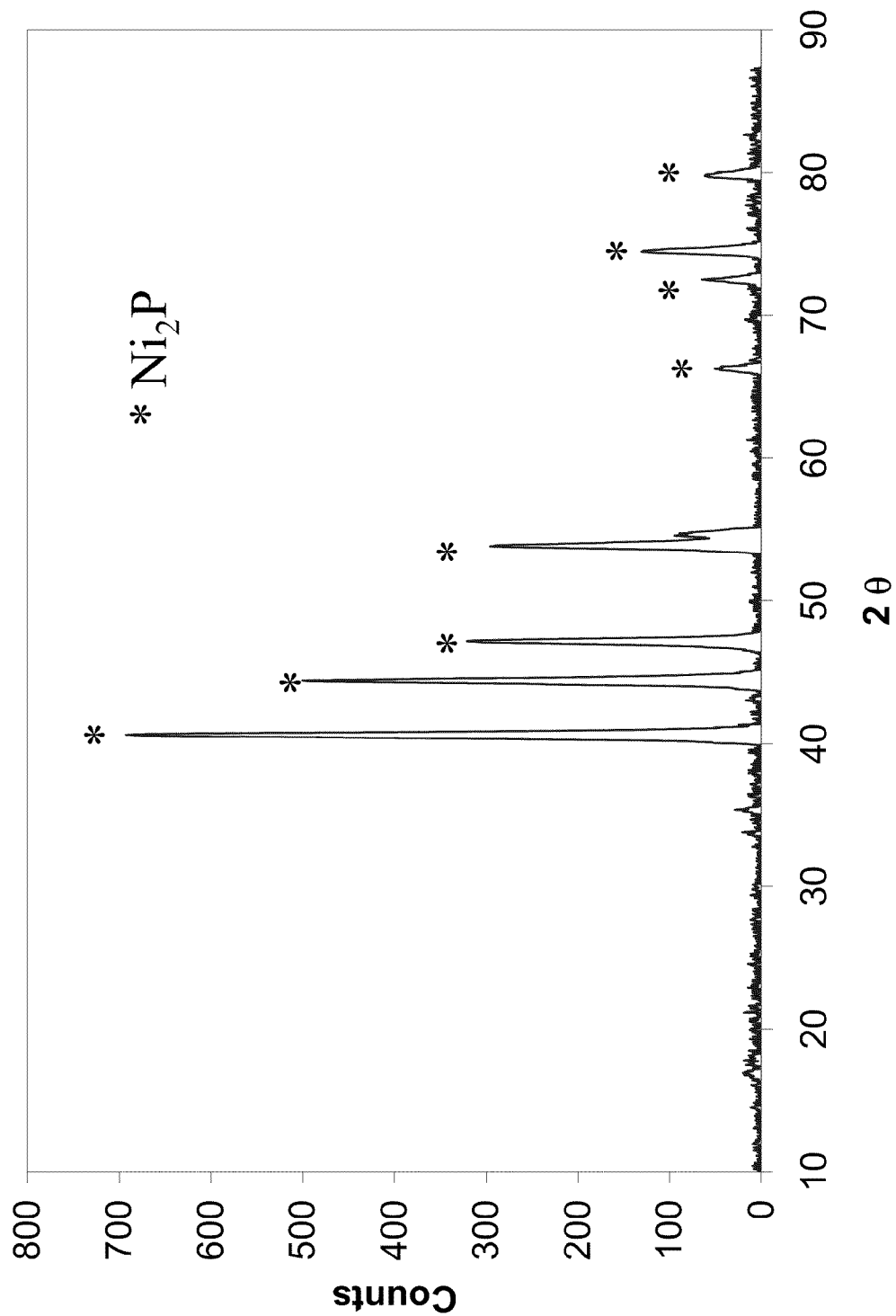
FIG. 1 shows an XRD spectrum of $Ni_2P$ synthesized according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, FIGS. 1-4, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

DEFINITIONS

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope (SEM)" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, the term "X-ray diffraction (XRD)" refers to one of X-ray scattering techniques that are a family of non-destructive analytical techniques which reveal information about the crystallographic structure, chemical composition, and physical properties of materials and thin films. These techniques are based on observing the scattered intensity of an X-ray beam hitting a sample as a function of incident and scattered angle, polarization, and wavelength or energy. In particular, X-ray diffraction finds the geometry or shape of a molecule, compound, or material using X-rays. X-ray diffraction techniques are based on the elastic scattering of X-rays from structures that have long range order. The most comprehensive description of scattering from crystals is given by the dynamical theory of diffraction.

As used herein, the term "Raman spectroscopy" or "Raman techniue" refers to an optical technique that probes the specific molecular content of a sample by collecting inelastically scattered light. As photons propagate through a medium, they undergo both absorptive and scattering events. In absorption, the energy of the photons is completely transferred to the material, allowing either heat transfer (internal conversion) or reemission phenomena such as fluorescence and phosphorescence to occur. Scattering, however, is normally an in-elastic process, in which the incident photons retain their energy. In Raman scattering, the photons either donate or acquire energy from the medium, on a molecular level. In contrast to fluorescence, where the energy transfers are on the order of the electronic bandgaps, the energy transfers associated with Raman scattering are on the order of the vibrational modes of the molecule. These vibrational modes are molecularly specific, giving every molecule a unique Raman spectral signature.

Raman scattering is a very weak phenomena, and therefore practical measurement of Raman spectra of a medium requires high power excitation laser sources and extremely sensitive detection hardware. Even with these components, the Raman spectra from tissue are masked by the relatively intense tissue auto-fluorescence. After detection, post processing techniques are required to subtract the fluorescent background and enable accurate visualization of the Raman spectra. Raman spectra are plotted as a function of frequency shift in units of wavenumber ($cm^{-1}$). The region of the Raman spectra where most biological molecules have Raman peaks is from 500 to 2000 $cm^{-1}$. In contrast to fluorescence spectra, Raman spectra have sharp spectral features that enable easier identification of the constituent sources of spectral peaks in a complex sample.

As used herein, "nanoscopic-scale," "nanoscopic," "nanometer-scale," "nanoscale," "nanocomposites," "nanoparticles," the "nano-" prefix, and the like generally refers to elements or articles having widths or diameters of less than about 1 μm, preferably less than about 100 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, "carbon nanostructures" refer to carbon fibers or carbon nanotubes that have a diameter of 1 μm or smaller which is finer than that of carbon fibers. However, there is no particularly definite boundary between carbon fibers and carbon nanotubes. By a narrow definition, the material whose carbon faces with hexagon meshes are almost parallel to the axis of the corresponding carbon tube is called a carbon nanotube, and even a variant of the carbon nanotube, around which amorphous carbon exists, is included in the carbon nanotube.

As used herein, "plurality" means two or more.

As used herein, the terms "comprising," "including," "carrying," "having," "containing," "involving," and the like are to be understood to be open-ended, i.e., to mean including but not limited to.

OVERVIEW OF THE INVENTION

The present invention provides, among other things, a process to prepare transition metal phosphides by microwaving phosphates in presence of lignin with carbon black optionally present in the mixture. The process is quick and yields pure well defined compounds in terms of composition. The process may yield carbon composites containing transition metal phosphides or pure transition metal phosphides depending on the reaction time. In various embodiments of the present invention, the synthesis of $Ni_2P$ nanospheres, $Ni_2P$ on silica support, and $Cu_3P$ on carbon support was successfully performed by a completely novel method that obviates the use of expensive exotic or toxic chemicals and is safe, quick and inexpensive.

Thus, in one aspect, the present invention provides a method of synthesizing transition metal phosphide. In one embodiment, the method has the steps of:

preparing a transition metal lignosulfonate;

mixing the transition metal lignosulfonate with phosphoric acid to form a mixture; and subjecting the mixture to a microwave radiation for a duration of time effective to obtain a transition metal phosphide.

In one embodiment, the preparing step comprises the step of heating a mixture of calcium lignosulfonate and a transition metal sulfate to a first temperature to obtain the transition metal lignosulfonate. The first temperature is about 90° C.

The transition metal comprises one of Ni, Cu, Mn, Fe, In, Ga, and Mo.

In one embodiment, the frequency of the microwave radiation is about 2.45 GHz.

In one embodiment, the transition metal phosphide is formed in the form of nanospheres. The average size of the nano-spheres is less than 100 nm.

In one embodiment, the transition metal phosphide is formed in in the form of nano-spheres and nano-sticks, respectively.

In another aspect, the present invention provides an article of manufacture made by the method set forth immediately above.

In yet another aspect, the present invention provides a method of synthesizing transition metal phosphide. In one embodiment, the method has the steps of:

preparing a mixture comprising a salt of lignin, a transition metal salt, phosphoric acid, silica, and carbon black; and subjecting the mixture to a microwave radiation for a duration of time effective to obtain a transition metal phosphide.

In one embodiment, the salt of lignin comprises sodium salt of lignin.

In one embodiment, the transition metal salt comprises transition metal chloride.

The transition metal comprises one of Ni, Cu, Mn, Fe, In, Ga, and Mo.

In one embodiment, the frequency of the microwave radiation is about 2.45 GHz.

In one embodiment, the transition metal phosphate coexists with carbon to form a carbon composite.

In a further aspect, the present invention provides an article of manufacture made by the method set forth immediately above.

In yet a further aspect, the present invention provides a method of synthesizing transition metal phosphide. In one embodiment, the method has the steps of:

preparing a mixture comprising a salt of lignin, a transition metal salt, and phosphoric acid; and subjecting the mixture to a microwave radiation for a duration of time effective to obtain a transition metal phosphide.

In one embodiment, the salt of lignin comprises sodium salt of lignin.

In one embodiment, the transition metal salt comprises a transition metal chloride.

In one embodiment, the transition metal comprises one of Ni, Cu, Mn, Fe, In, Ga, and Mo.

In one embodiment, the frequency of the microwave radiation is about 2.45 GHz.

In one embodiment, the transition metal phosphide is formed in the form of nanospheres.

In a further aspect, the present invention provides an article of manufacture made by the method set forth immediately above.

In yet another aspect, the present invention provides a method of synthesizing transition metal phosphide. In one embodiment, the method has the steps of:

preparing a mixture comprising a salt of lignin, a transition metal salt, and a compound containing a pnictogen selected from the group consisting of nitrogen, phosphorus, arsenic, antimony, and bismuth; and subjecting the mixture to a microwave radiation for a duration of time effective to obtain a transition metal pnictide.

In another aspect, the present invention provides a method of synthesizing transition metal chalcogenide. In one embodiment, the method has the steps of:

preparing a mixture comprising a salt of lignin, a transition metal salt, and a compound containing a chalcogen selected from the group consisting of oxygen, sulfur, selenium, and tellurium; and subjecting the mixture to a microwave radiation for a duration of time effective to obtain a transition metal chalcogenide.

In yet another aspect, the present invention provides a method of synthesizing transition metal tetrilide. In one embodiment, the method has the steps of:

preparing a mixture comprising a salt of lignin, a transition metal salt, and a compound containing an element selected from the group consisting of carbon, silicon, germanium, tin, and lead; and subjecting the mixture to a microwave radiation for a duration of time effective to obtain a transition metal tetrilide.

Additional details are set forth below.

EXAMPLES

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Example 1

Synthesis of $Ni_2P$ Nanoparticles

In one embodiment of the present invention, a process for synthesis of $Ni_2P$ nanoparticles was performed successfully. In doing so, calcium lignosulfonate (BCA) was obtained from Lignotech, Inc. A 10 g sample of Borresperse CA containing 5% $Ca^{2+}$ (0.5 g, 0.0125 moles) was dissolved in 40 mL $H_2O$ and heated to 90° C. Then 3.29 g of $NiSO_4.6H_2O$ (0.0125 moles) was added and stirred for 60 minutes at 90° C. The solution was then filtered to remove the $CaSO_4$ formed through a coarse filter paper (Whatman 4) using vacuum suction. The filtrate was then evaporated to dryness by placing the beaker containing Nickel lignosulfonate solution on a hot plate at 70° C. under the hood. Yield of Nickel lignosulfonate was 10.08 g, which was about 87% yield.

To 1.0 g of the Nickel lignosulfonate, 4 drops of 85% $H_3PO_4$ was added and mixed thoroughly using a mortar and pestle. Then 2 additional drops of phosphoric acid was added without mixing and the mixture was microwaved in a $SiO_2$ crucible in a microwave oven placed under a hood operating at 2.45 GHz, 1 KW power. In a matter of 30 seconds there was sparkling, followed by a red glow and the process was continued for a total of 14 minutes. The resultant material was cooled, powdered and then suspended in 15 mL of $H_2O$ and boiled for 30 minutes. It was then filtered through suction and washed with additional 400 mL of $H_2O$. The final product, a collection of $Ni_2P$ nanoparticles, was dried and then weighed, which yielded 0.26 g final product.

Example 2

Synthesis of $Ni_2P$ Nanoparticles on Silica Support

In one embodiment of the present invention, a process for synthesis of $Ni_2P$ nanoparticles on silica support was performed successfully. In doing so, a 1 g sample of Indulin C (Meadwestvaco) was mixed with 0.297 g of $NiCl_2.6H_2O$ in a mortar and pestle. Then 8 drops of concentrated phosphoric acid ($H_3PO_4$, 85%) was added and thoroughly mixed using the mortar and pestle. Then 0.7 g of silica gel (Aldrich Chemical Co.) was added and mixed thoroughly. Finally, 0.05 g of carbon black (Superior Graphite) was added and mixed. The mixture was then microwaved in a microwave oven placed under a hood operating at 2.45 GHz, 1 KW power for a total of 20 minutes. The resultant material was cooled, powdered and boiled in 100 mL water for 10 minutes. It was then filtered using a coarse filter paper using suction and washed with 200 mL water. It was finally dried under vacuum and weighed, which yielded 1.02 g final product.

Example 3

Synthesis of $Cu_3P$ Nanoparticles

In one embodiment of the present invention, a process for synthesis of $Cu_3P$ nanoparticles was performed successfully. In doing so, a 1 g sample of Indulin C (Meadwestvaco) was mixed with 0.426 g of $CuCl_2 \cdot 2H_2O$ (2.5 mmoles) thoroughly in a mortar and pestle. Then 8 drops of concentrated phosphoric acid ($H_3PO_4$, 85%) was added and thoroughly mixed with the mortar and pestle. The mixture was microwaved in a Pyrex test tube for a total of 16 minutes in a microwave oven placed under a hood operating at 2.45 GHz, 1 KW power. During the microwave process the mixture started smoking after about 1 minute. The reaction mixture started sparkling in about 3 minutes and then turned red hot. Towards the end no smoke or sparkling was observed. The material was cooled, powdered and boiled in 100 mL water. It was filtered and washed with 100 mL water. It was then dried in vacuum and weighed, which yielded 0.44 g final product.

Example 4

Formation of Nickel Phosphide

It is believed that $Ni_2P$ is formed according to various embodiments of the present invention by the carbothermal reduction of nickel phosphate.

It is believed that $Ni^{2+}$ lignosulfonate decompose to yield $SO_3$, lignin and elemental Ni. There is evidence that Ni is formed, as microwaving Nickel lignosulfonate (with graphite initiator) shows elemental Ni in XRD (data not shown). It has been shown that the principal pyrolysis gases from lignin are CO, $CH_4$, $CO_2$ and $H_2$. Thus, in theory, it may be proposed that lignin degradation could be a source of hydrogen gas which could reduce Nickel ion to elemental Nickel. Nickel may then react with $H_2$, CO, $CH_4$ or $CO+H_2$ (all being gases). The overall reaction to explain the transformation taking place in the microwave assisted reaction may be summarized in the possible reactions as follows:

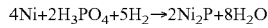

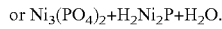

Other possible reactions theorized are:

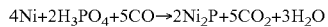

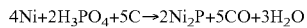

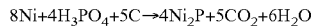

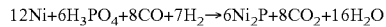

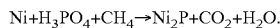

As shown in FIG. 1, the XRD spectrum of the sample as produced in EXAMPLE 1 indicates that pure $Ni_2P$ is produced. There is an exact match with $Ni_2P$ standard file with no other impurities. Surprisingly, it is not observed any carbon peaks (either crystalline or amorphous) in the XRD spectrum.

Figure 2:
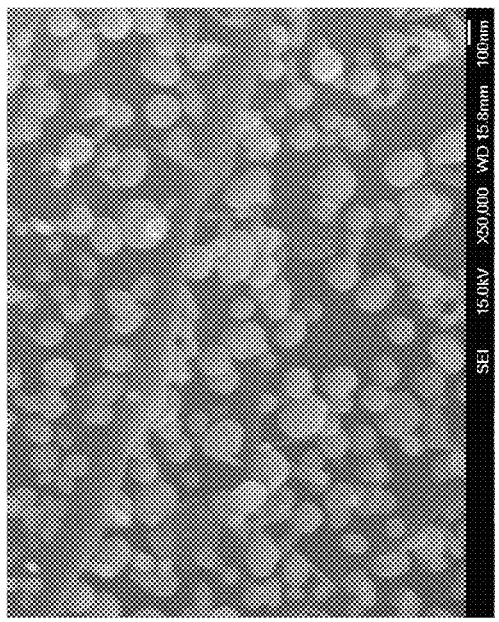
FIG. 2 shows SEM images of $Ni_2P$ synthesized according to one embodiment of the present invention.
Figure 2:
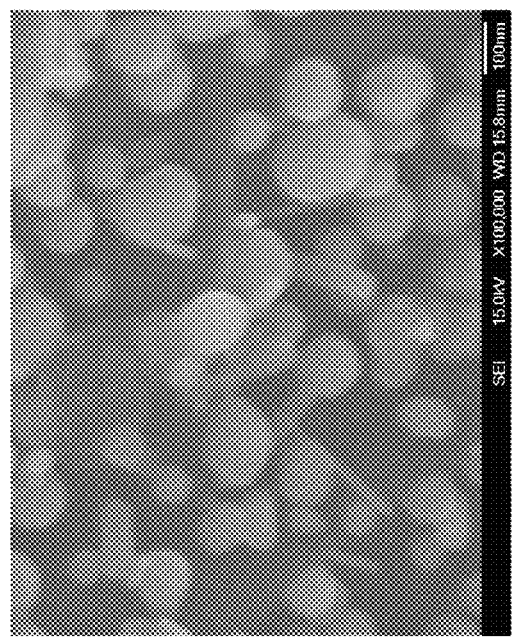
Figure 2:
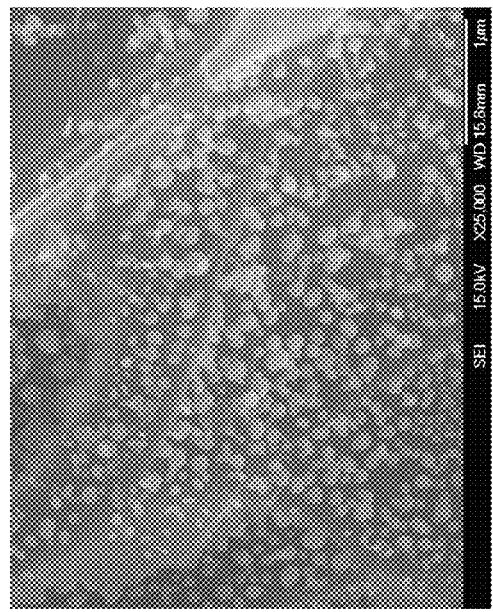

The SEM of the sample as produced in EXAMPLE 1, as shown in FIG. 2, shows that the morphology of the sample is in the form of nanospheres, with an average nanosphere size of <100 nm. The fold seen in the middle of the image is probably due to the tape that is used to support the sample.

There is also evidence of nanosticks but there is strong reason to believe that they are also in fact $Ni_2P$. Liu et. al.[4] have observed the formation of such nanosticks projecting from nanospheres in the sample of Ni2P they prepared in an aqueous environment. They propose that aggregated nanoparticles form nanospheres after which the sticks decorate them. The sticks then propagate to give dendritic structures.

Example 5

Formation of $Ni_2P$ on Silica Support

Figure 3:
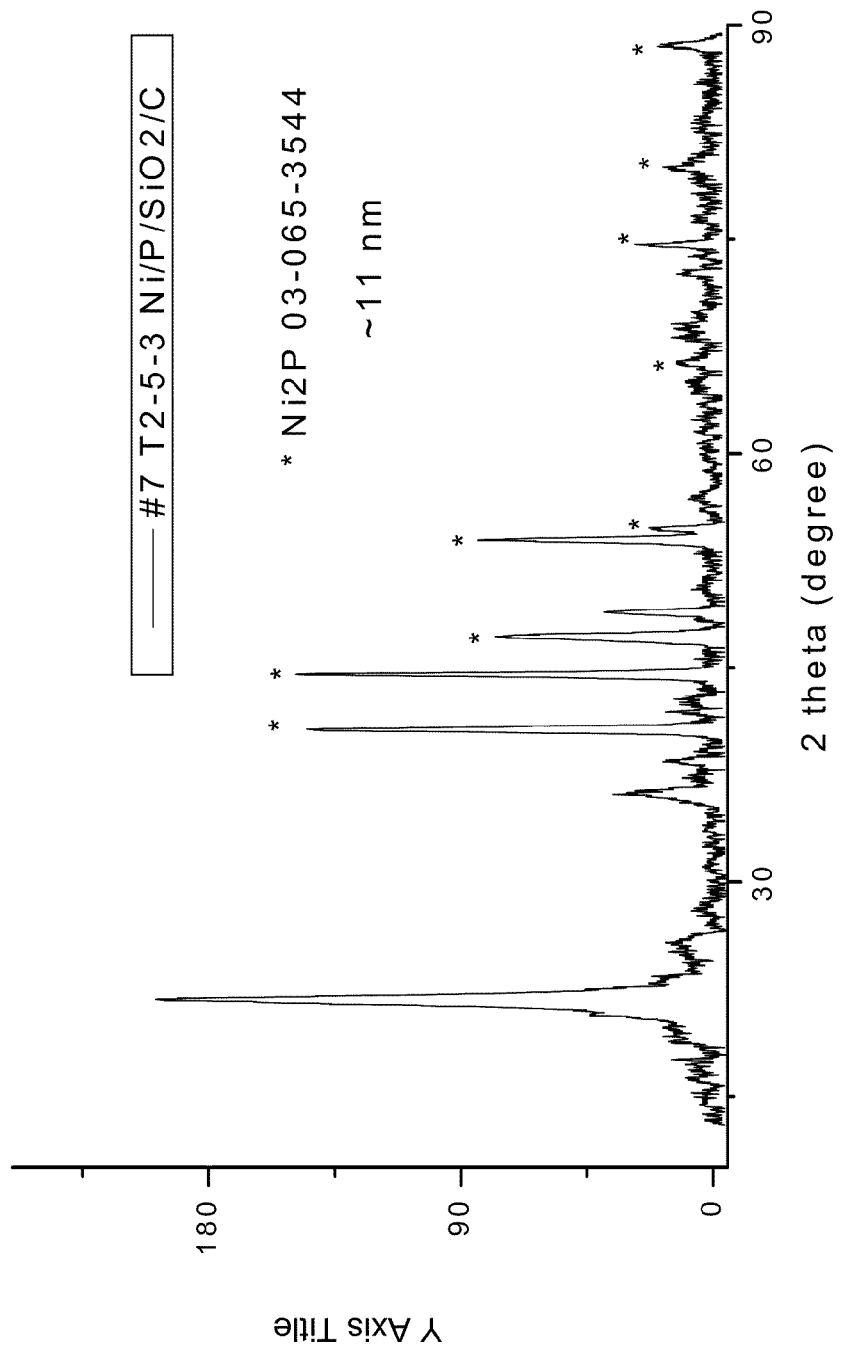
FIG. 3 shows an XRD spectrum of $Ni_2P$ synthesized in presence of silica according to one embodiment of the present invention.

FIG. 3 shows the XRD spectrum of $Ni_2P$ prepared in the presence of silica as produced in EXAMPLE 2. It can be seen that all the peaks expected from $Ni_2P$ is present in the sample. In addition, the characteristic peak for carbon is also evident. The remaining peaks are due to silica. No other peaks are evident indicating that $SiO_2$ remains unaffected under the reaction conditions.

Figure 4A:
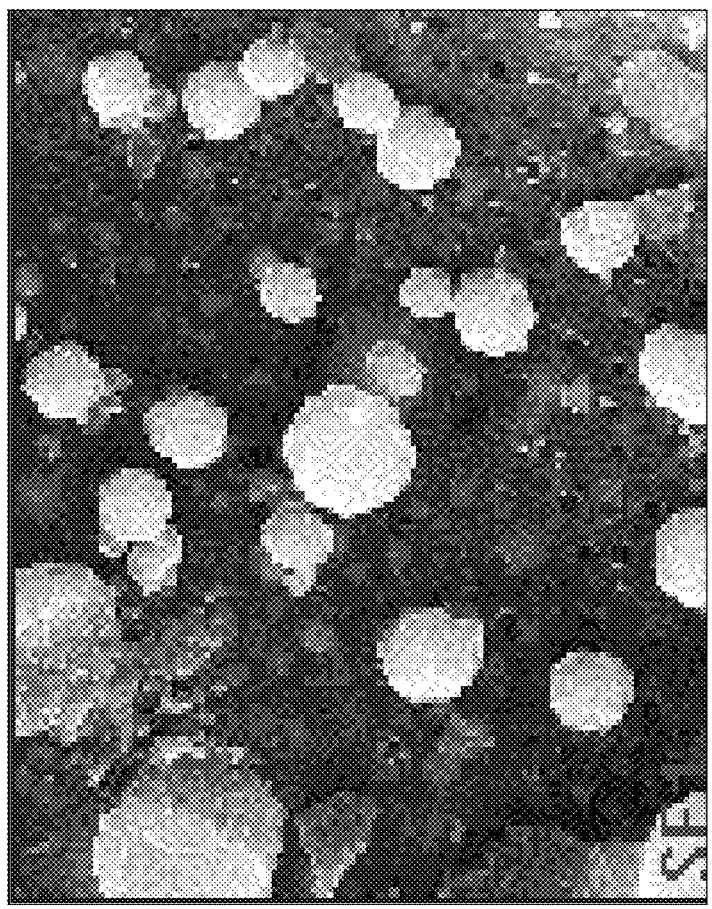
FIG. 4 shows SEM image, an EDX spectrum of $Ni_2P$ and corresponding data for copper phosphide synthesized according to one embodiment of the present invention.
Figure 4B:
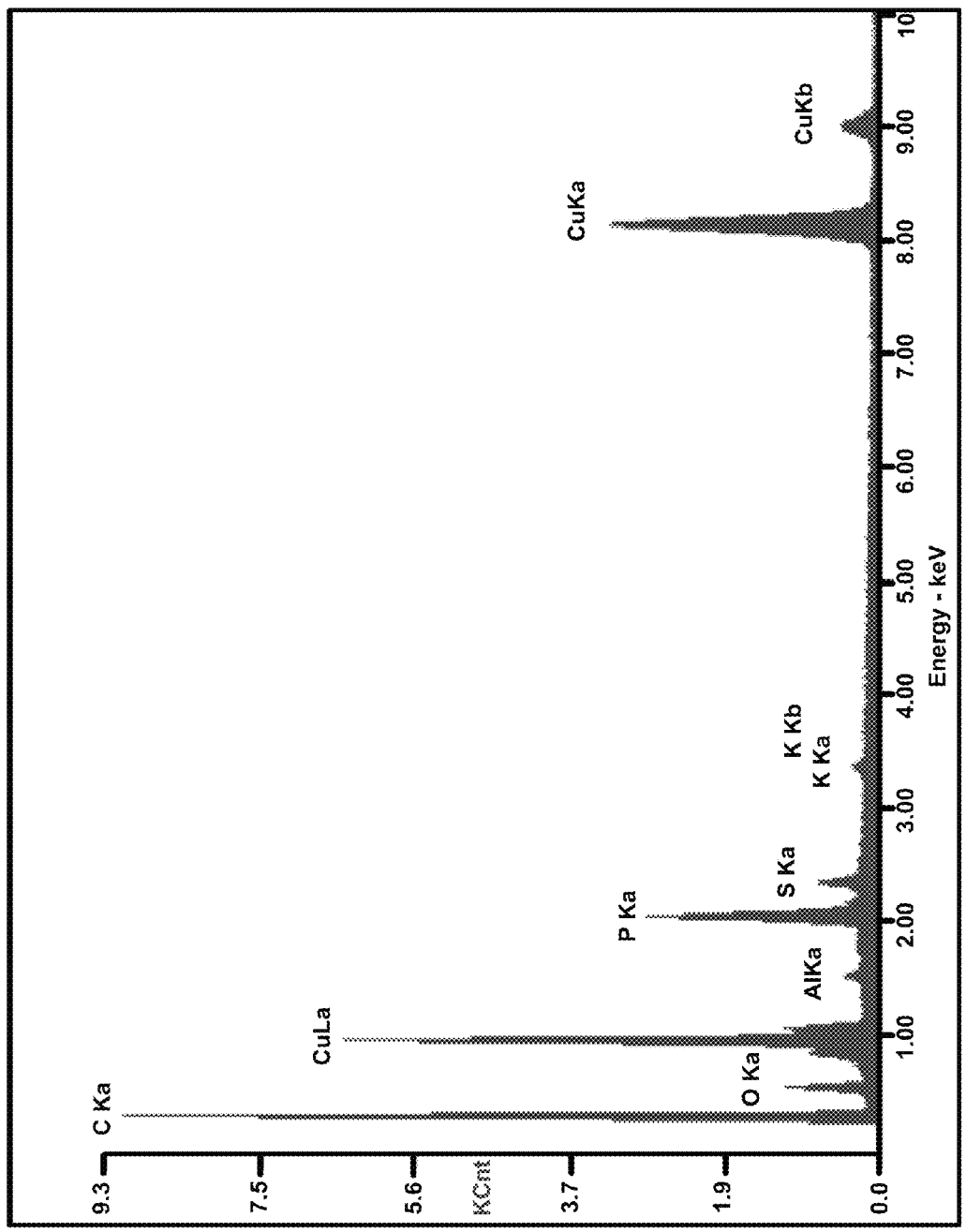

The SEM of the sample as produced in EXAMPLE 2, as shown in FIG. 4, shows images of cuprous phosphide made by the process set forth above according to one embodiment of the present invention. The EDX of the region shown on the left is shown on the right. It can be seen from the Table in FIG. 4 corresponding to the EDX data that there are three copper atoms to every phosphorus atom. The nanoparticles obtained may be described as being comprised of nanospheres decorated with needles.

Accordingly, among other things, the present invention provides novel methods for synthesis of $Ni_2P$ nanoparticles using a Nickel salt containing a carbon source and $H_3PO_4$. The process is inexpensive, easily scalable and quick. It is especially suitable for industrial setting where safety, expense and time is of essence. The method also lends itself for synthesis of other transition metal tetrilides, pnictides and chalcogenides. In particular, transition metals such as Ni, Cu, Mn, Fe, In, Ga, and Mo can be utilized to practice the present invention.

The resultant different transition metal phophides that can be made according to various embodiments of the present invention can find many applications, some of which are listed in the following Table 1:

TABLE 1

A few applications of metal phosphides

| Metal Phosphides | Applications |
| --- | --- |
| $Ni_2P$ | catalyst for simultaneous hydroprocessing (hydrodesulfurization and hydrodenitrogenation) of petroleum feedstocks (better than sulfided $Mo/SiO_2$ and $Ni-Mo/SiO_2$ currently used); Useable in modifying the physical properties of materials, corrosion resistant materials, wear-proof materials; luminescent devices |
| $Cu_3P$ | Useable as a negative electrode material, fine solder and as an important alloy addition |
| $Mn_2P$ | able to intercalate Li ion reversibly with low potential thus potentially being useful in fabricating Lithium batteries |
| FeP | Useable as low bandgap semiconductor material with special magnetic properties; nanowires prepared by thermal decomposition of $(_4-C_6H_8)Fe(CO)_3$ |
| InP | Useable as nanobarcodes, thin film transistors, light emitting diodes, high power and high speed electronics |

TABLE 1-continued

A few applications of metal phosphides

| Metal Phosphides | Applications |
|---|---|
| GaP | Useable for enhancing scattering efficiency of visible light |
| MoP | Useable for Hydroprocessing (Hydrodesulfurization and Hydrodenitrogenation) of organic compounds |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

1. Oyama, S. Ted. Novel catalysts for advanced hydroprocessing: transition metal phosphides. *Journal of Catalysis* (2003), 216(1-2), 343-352.
2. Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. *Journal of Catalysis* (2002), 209(1), 1-5.
3. Oyama, S. Ted; Lee, Yong-Kul. Mechanism of Hydrodenitrogenation on Phosphides and Sulfides. *Journal of Physical Chemistry B* (2005), 109(6), 2109-2119.
4. Liu, Shuling; Liu, Xinzheng; Xu, Liqiang; Qian, Yitai; Ma, Xicheng. Controlled synthesis and characterization of nickel phosphide nanocrystal. *Journal of Crystal Growth* (2007), 304(2), 430-434.
5. Xie, Songhai; Qiao, Minghua; Zhou, Wuzong; Luo, Ge; He, Heyong; Fan, Kangnian; Zhao, Tiejun; Yuan, Weikang. Controlled synthesis, characterization, and crystallization of Ni—P nanospheres. *Journal of Physical Chemistry B* (2005), 109(51), 24361-24368.
6. Wang, Xinjun; Han, Kun; Gao, Youjun; Wan, Fuquan; Jiang, Kai. Fabrication of novel copper phosphide ($Cu_3P$) hollow spheres by a simple solvothermal method. *Journal of Crystal Growth* (2007), 307(1), 126-130.

What is claimed is:

1. A method of synthesizing transition metal phosphide, comprising the steps of:
    (a) preparing a mixture consisting of a salt of lignin, a transition metal salt, phosphoric acid, silica, and carbon black; and
    (b) subjecting the mixture to a microwave radiation for a duration of time effective such that the mixture is smoking and sparkling, thereby reducing phosphorus having a positive oxidation state of the phosphorus acid to phosphorus having a negative oxidation state, and forming a transition metal phosphide nanoparticle using the phosphorus from the phosphorus acid and the transition metal from the transition metal lignosulfonate,
    wherein the transition metal comprises one of Cu, Fe, Ga, Mo, Co, Zn, Zr and Ti; and
    wherein the preparing and the reducing are executed without adding a reducing gas or an inert gas.

2. The method of claim 1, wherein the salt of lignin comprises sodium salt of lignin.

3. The method of claim 1, wherein the transition metal salt comprises transition metal chloride.

4. The method of claim 1, wherein the frequency of the microwave radiation is about 2.45 GHz.

5. The method of claim 1, wherein the transition metal-phosphide coexists with carbon to form a carbon composite.

6. A method of synthesizing transition metal phosphide, comprising the steps of:
    (a) preparing a mixture consisting of a salt of lignin, a transition metal salt, and phosphoric acid; and
    (b) subjecting the mixture to a microwave radiation for a duration of time effective such that the mixture is smoking and sparkling, thereby reducing phosphorus having a positive oxidation state of the phosphorus acid to phosphorus having a negative oxidation state, and forming a transition metal phosphide nanoparticle using the phosphorus from the phosphorus acid and the transition metal from the transition metal lignosulfonate,
    wherein the transition metal comprises one of Cu, Fe, Ga, and Mo.

7. The method of claim 6, wherein the salt of lignin comprises sodium salt of lignin.

8. The method of claim 6, wherein the transition metal salt comprises a transition metal chloride.

9. The method of claim 6, wherein the frequency of the microwave radiation is about 2.45 GHz.

10. The method of claim 6, wherein the transition metal phosphide is in the form of nano-spheres.

* * * * *